July 19, 1960 J. T. TOMAN 2,945,480
FLUID PRESSURE ACTUATED RECIPROCATING MECHANISM
Filed April 10, 1959 2 Sheets-Sheet 1
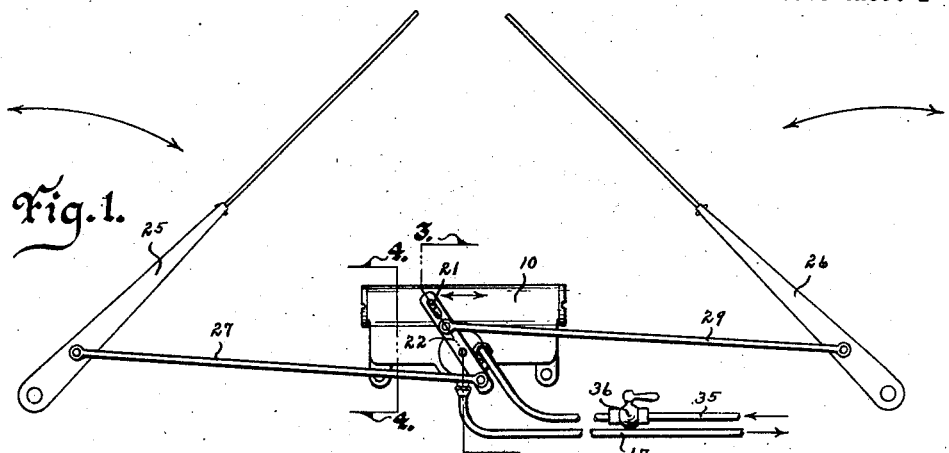
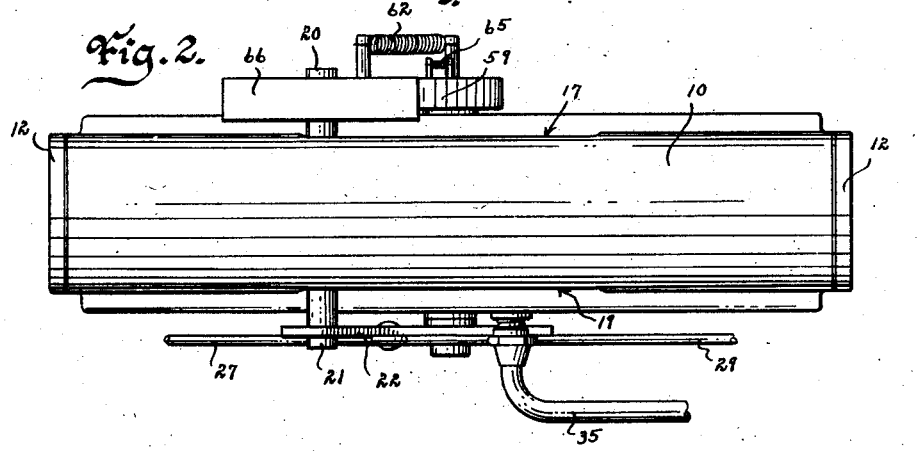
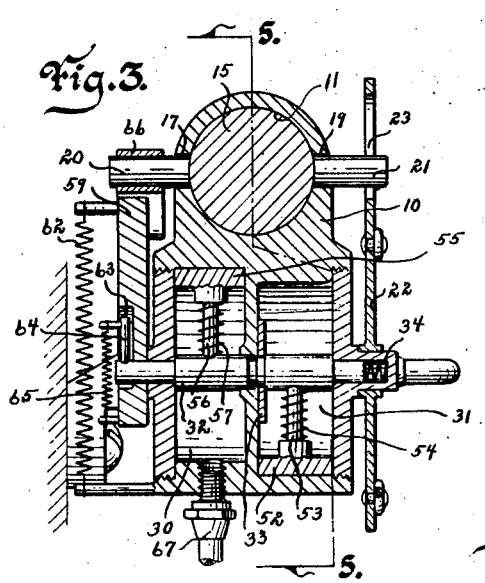
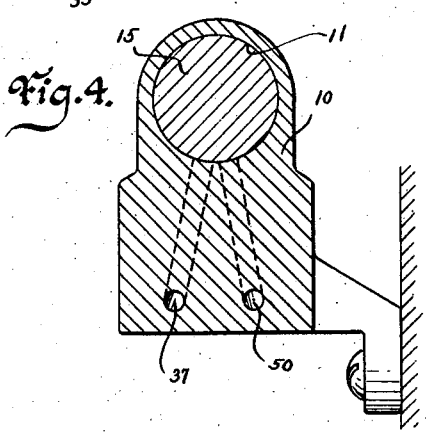
Inventor
James T. Toman
by M. Talbert Dick
Attorney July 19, 1960    J. T. TOMAN    2,945,480
FLUID PRESSURE ACTUATED RECIPROCATING MECHANISM
Filed April 10, 1959    2 Sheets-Sheet 2
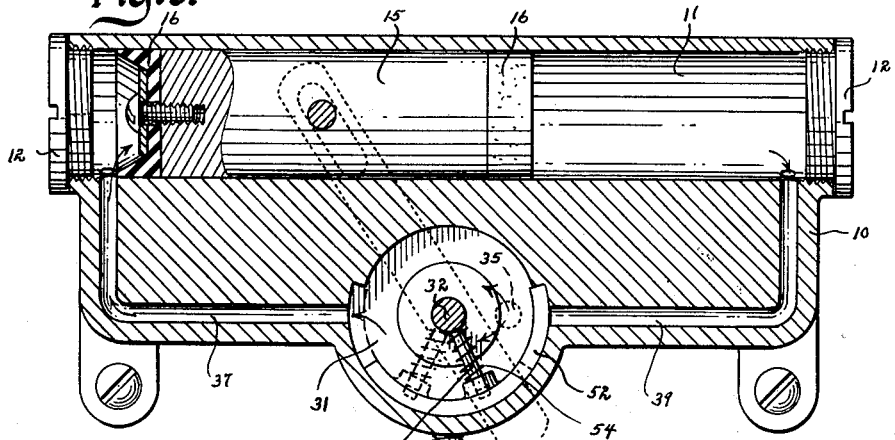
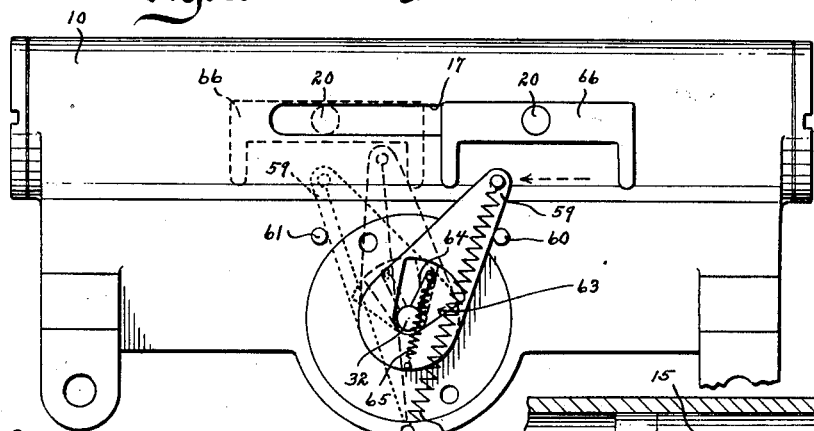
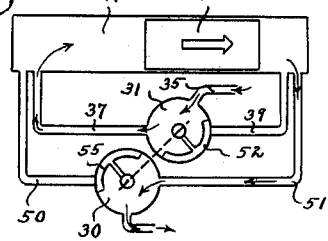
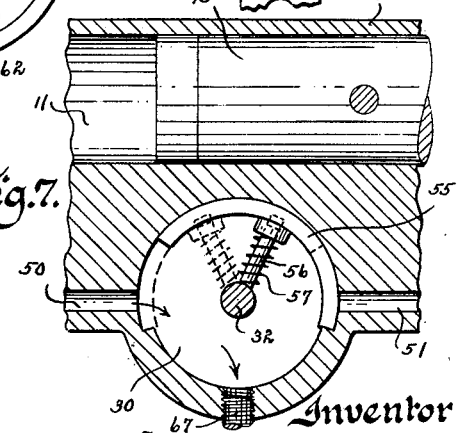
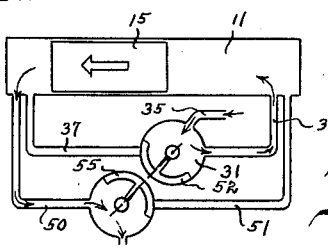
Witness
Edward P. Seeley
Inventor
James T. Toman
by M. Talbert Dick
Attorney

United States Patent Office 2,945,480
Patented July 19, 1960

2,945,480

FLUID PRESSURE ACTUATED RECIPROCATING MECHANISM

James T. Toman, Des Moines, Iowa, assignor of one-half to David H. Lipsey, Des Moines, Iowa Filed Apr. 10, 1959, Ser. No. 805,427

8 Claims. (Cl. 121—164)

This invention relates to an automatic reciprocating mechanism actuated by fluid pressure and capable of powering reciprocating members such as vehicle windshield wipers, and like.

There are many devices requiring reciprocatory movement. Many types of powered mechanisms have been employed to accomplish this desired action, but usually such mechanisms employ intermittently exposed valve openings. Obviously, the throw of the reciprocated member is not uniform and also the power force is reduced near the end of the reciprocation in both directions.

Therefore one of the principal objects of my invention is to provide a fluid pressure actuated motor for imparting reciprocatory movement to members.

A still further object of this invention is to provide a reciprocatory power unit that has uniform actuation.

A still further object of this invention is to provide a fluid pressure actuated reciprocating mechanism that incorporates an instantaneous valve change means at each end of the reciprocatory movement.

Still further objects of my invention are to provide a pressure actuated reciprocating device that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a back view showing my device actuating the arms of two windshield wipers;

Fig. 2 is an enlarged top plan view of my unit;

Fig. 3 is an enlarged cross-sectional view of my device taken on line 3—3 of Fig. 1;

Fig. 4 is an enlarged cross-sectional view of the device taken on line 4—4 of Fig. 1;

Fig. 5 is an enlarged longitudinal sectional view of the unit taken on line 5—5 of Fig. 3 and more fully illustrates its construction;

Fig. 6 is an enlarged front view of my unit;

Fig. 7 is an enlarged longitudinal sectional view showing one position of the pressure entrance control valve mechanism;

Fig. 8 is an illustrative diagram showing the valve arrangement when the piston is being moved to the right; and Fig. 9 is an illustrative diagram showing the valve arrangement when the piston is moving to the left.

In these drawings I have used the numeral 10 to generally designate the base housing of the unit. Extending horizontally through the upper portion of this base 10 is a cylindrical bore 11. A detachable cap 12 is threaded into each end of this bore for sealing each of its ends. Slidably mounted in the bore is a two-way free piston 15 having a resilient gasket 16 at each end as shown in Fig. 5. The numeral 17 designates a horizontal slot in the forward side of the base housing communicating and parallel with the bore. The numeral 19 designates a like horizontal slot in the rear side of the base housing, parallel with the slot 17 and communicating with the bore. The numeral 20 designates a shaft extending from the piston and through the slot 17. The numeral 21 designates a shaft extending from the piston through the slot 19. Pivoted near its center to the lower back side area of the base housing is the actuating arm 22 having a slot 23 in its upper end area slidably embracing the shaft 21. By this arrangement when the piston is reciprocated, the actuating arm will be swung first to the left and then to the right. In the drawings I show two wiper blade arms 25 and 26 operatively connected to the actuating arm by the linkage rods 27 and 29, respectively. In the lower portion of the base housing are two substantially side by side compartments 30 and 31 each having a continuous circular wall as shown in Fig. 3. The numeral 32 designates a shaft rotatably extending through the forward side of the base housing and through the compartments 30 and 31. The compartment 31 must be sealed from the compartment 30 at the point where the shaft 32 passes from one compartment to the other. I show a sealing plate 33 on the shaft 32, adjacent the wall between the two compartmens. This plate is yieldingly held tight against the wall between the two compartments by the spring 34 having one end engaging the base housing and its other end engaging the rear end of the shaft 32 as shown in Fig. 3. The compartment 31 is the fluid pressure distribution chamber, and the numeral 35 designates a conduit having one end communicating with the inside end of the compartment 31 and its other end adapted to be in communication with a source of fluid under pressure. The numeral 36 designates an adjustable valve imposed in the conduit 35. The numeral 37 designates a passageway in the base housing having one end communicating with the left inside of the compartment 31 and its other end communicating with the left inside of the bore 11. The numeral 39 designates a passageway in the base housing having one end communicating with the right inside of the compartment 31 and its other end communicating with the right inside of the bore 11. The numeral 50 designates a passageway in the base housing having one end communicating with the left inside of the compartment 30 and its other end communicating with the left inside of the bore 11. The numeral 51 designates a passageway in the base housing having one end communicating with the right inside of the compartment 30 and its other end communicating with the right inside of the bore 11. The numeral 52 designates an arcuate shoe slidably rotatably engaging the lower circular inside wall of the compartment 31. Extending radially from the shaft 32 and longitudinally slidable in the shoe 52 is a stub shaft 53. The numeral 54 designates a coil spring embracing the stub shaft having one end engaging the shaft 32 and its other end yieldingly engaging the show 52. An arcuate shoe 55 rotatably slidably engages the upper circular wall of the compartment 30. Radially extending from the shaft 32 is a stub shaft 56 having its outer end longitudinally slidably engaging the shoe 55. The numeral 57 designates a coil spring embracing the stub shaft 56 having one end engaging the shaft 32 and its other end yieldingly engaging the shoe 55. The shoe 52 is capable of oscillating to the left to close the passageway 39 where it communicates with the compartment 31 and oscillating to the right to close the passageway 37 where it communicates with the compartment 31. The oppositely arranged shoe 55 is capable of oscillating to the left to close the passageway 50 where it communicates with the compartment 30 and oscillating to the right to close the passageway 51 where it communicates with the compartment 30. The shoe 55 is positioned substantially diametrically opposite from that of the position of the shoe 52. The numeral 59 designates a toggle arm freely rotatable on that portion of the shaft 32 that extends through the forward side of the base housing. The numeral 60 designates a stop on the base housing for limiting the swinging action of the arm 59 in one direction. The numeral 61 designates a stop on the base housing for limiting the swinging action of the arm 59 in the other direction as shown in Fig. 6. The arm 59 extends upwardly between these two spaced apart stops 60 and 61. The numeral 62 designates a coil spring having one end connected to the upper end portion of the arm 59 and its other end connected to the base housing below the pivot point of the arm 59. By this arrangement of parts the arm 59 will toggle to the left or to the right and will be yieldingly held in contact either with the stop 60 or the stop 61. In the face of the arm 59 is an upwardly extending fan shaped depression 63. The lower area of this depression 63 registers with the shaft 32. The numeral 64 designates a radially extending pin on the shaft 32 and positioned within the depression 63 as shown in Fig. 3. By this arrangement of parts the shaft 32 has limited reciprocatory rotation relative to the arm 59. The numeral 65 designates a coil spring having one end connected to the upper end of pin 64 and its lower end connected to the arm 59 at a point below the shaft 32 as shown in Fig. 6. This spring 65 causes the pin to toggle left or right into engagement with the right and left side walls of the depression 63. The numeral 66 designates an inverted U-member rigidly connected to the shaft 20 and loosely embracing the upper end of the arm 59 as shown in Fig. 6. The numeral 67 designates an exhaust conduit communicating with the inside bottom of the compartment 30.

The operation of the device is as follows: With the fluid under pressure in the pipe 35 and with the valve 36 opened or partially opened, this pressure will first pass into the compartment 31. The shoe 52 will be closing the passageway 39 and the shoe 55 will be closing the passageway 50. The fluid pressure will pass from the compartment 31 through the passageway 37 and into the left end of the bore 11 thus moving the piston to the right as shown in Fig. 8. The fluid at the right of the piston 15 will pass through the passageway 51 into the compartment 30 and out through the exhaust conduit 67. This movement of the piston, however, will carry the inverted U-member 66 and this movement of the U-member 66 will engage the arm 59 and move it toward its other stop. This will not initially affect the rotation of the shaft 32. The wall of the depression 63 will, however, eventually engage the pin 64 and will start moving the pin and shaft 32. However, by this time the piston 15 will be approaching the right end of the bore, the arm 59 and pin 64 will pass over center and the springs 62 and 65 will snap the arm 59 and pin to their extreme movements in that direction. This latter action will be instantaneous and the shaft 32 will be rotated instantly to move the shoe 52 to close the passageway 37 and the shoe 55 to close the passageway 51. With these passageways closed and the passageways 39 and 50 opened, the fluid pressure will pass from the compartment 31 through the passageway 39 and to the right end of the bore 11 as shown in Fig. 9. The pressure will move the piston 15 to the left, and the fluid ahead of it will pass through the passageway 50 into the compartment 30 and out the exhaust conduit 67. The arm 59 will be engaged by the U-member 66 in this opposite direction of movements and the arm 59 and pin 64 will toggle the opposite direction as the piston 15 nears its final throw to the left. This will again reverse the position of the shoes 52 and 55 and will complete the first cycle. Thus it will be seen that the reciprocation of the piston 15 will be continuous and automatic. The speed of reciprocation may be controlled by the valve 36. Either air or liquid may be used as the fluid under pressure. If a liquid is used, the exhaust conduit 67 should return the exhausted liquid to the liquid supply means.

Some changes may be made in the construction and arrangement of my fluid pressure actuated reciprocating mechanism without departing from the real spirit and purpose of my invention, and it is my intention to cover by my claims, any modified forms of structure or use of mechanical equivalents which may be reasonably included within their scope.

I claim:

1. In a fluid pressure actuated reciprocating mechanism, a base having a bore closed at each of its ends, a slot in said base communicating with said bore and parallel therewith, a single free piston slidable in said bore, a radial member on said piston and extending through said slot, an inlet passageway in said base communicating with the inside of one end area of said bore, a second inlet passageway in said base communicating with the inside of the other end area of said bore, an exhaust passageway in said base communicating with the inside of one end area of said bore, a second exhaust passageway in said base communicating with the inside of the other end area of said bore, a movable valve means adapted to be in communication with a source of fluid pressure and capable of communicating with said first mentioned inlet passageway when in one position of its movement and capable of communicating with said second passageway when in a different position of its movement, a second movable valve means having an exhaust outlet and capable of communicating with said first mentioned exhaust passageway when in one position of its movement and capable of communicating with said second exhaust passageway when in a different position of its movement, spring loaded toggle means operatively connected to said first mentioned and said second movable valve means, means on said radial member capable of moving said toggle means in one direction when said piston is moved in one direction and capable of moving said toggle means in the other direction when said piston is moved in the other direction; said last mentioned means having substantial free movement in both directions prior to the moving and tripping of said toggle means.

2. In a fluid pressure actuated reciprocating mechanism, a base having a bore closed at each of its ends, a slot in said base communicating with said bore and parallel therewith, a single free piston slidable in said bore, a radial member on said piston and extending through said slot, an inlet passageway in said base communicating with the inside of one end area of said bore, a second inlet passageway in said base communicating with the inside of the other end area of said bore, an exhaust passageway in said base communicating with the inside of one end area of said bore, a second exhaust passageway in said base communicating with the inside of the other end area of said bore, a movable rotary valve means adapted to be in communication with a source of fluid pressure and capable of communicating with said first mentioned inlet passageway when in one position of its movement and capable of communicating with said second passageway when in a different position of its movement, a second movable rotary valve means having an exhaust outlet and capable of communicating with said first mentioned passageway when in one position of its movement and capable of communicating with said second exhaust passageway when in a different position of its movement, spring loaded toggle means operatively connected to said first mentioned and said second movable valve means, and means on said radial member capable of moving said toggle means in one direction when said piston is moved in one direction and capable of moving said toggle means in the other direction when said piston is moved in the other direction; said last mentioned means having substantial free movement in both directions prior to the moving and tripping of said toggle means.

3. In a fluid pressure actuated reciprocating mechanism, a base having a bore closed at each of its ends, a slot in said base communicating with said bore and parallel therewith, a single free piston slidable in said bore, a radial member on said piston and extending through said slot, an inlet passageway in said base communicating with the inside of one end area of said bore, a second inlet passageway in said base communicating with the inside of the other end area of said bore, an exhaust passageway in said base communicating with the inside of one end area of said bore, a second exhaust passageway in said base communicating with the inside of the other end area of said bore, a movable rotatory valve means adapted to be in communication with a source of fluid pressure and capable of communicating with said first mentioned inlet passageway when in one position of its movement and capable of communicating with said second passageway when in a different position of its movement, a second movable rotatory valve means having an exhaust outlet and capable of communicating with said first mentioned exhaust passageway when in one position of its movement and capable of communicating with said second exhaust passageway when in a different position of its movement, spring loaded toggle means operatively connected to said first mentioned and said second movable valve means, means on said radial member capable of moving and tripping said toggle means in one direction when said piston is moved in one direction and capable of moving and tripping said toggle means in the other direction when said piston is moved in the other direction; said last mentionel means having substantial free movement in both directions prior to the moving and tripping of said toggle means.

4. In a fluid pressure actuated reciprocating mechanism, a base having a bore closed at each of its ends, a slot in said base communicating with said bore and parallel therewith, a single free piston slidable in said bore, a radial member on said piston and extending through said slot, an inlet passageway in said base communicating with the inside of one end area of said bore, a second inlet passageway in said base communicating with the inside of the other end area of said bore, an exhaust passageway in said base communicating with the inside of one end area of said bore, a second exhaust passageway in said base communicating with the inside of the other end area of said bore, a movable rotatory valve means adapted to be in communication with a source of fluid pressure and capable of communicating with said first mentioned inlet passageway when in one position of its movement and capable of communicating with said second passageway when in a different position of its movement, a second movable rotatory valve means having an exhaust outlet and capable of communicating with said first mentioned exhaust passageway when in one position of its movement and capable of communicating with said second exhaust passageway when in a different position of its movement, spring loaded toggle means operatively connected to said first mentioned and said second movable valve means, U-shaped member on said radial member capable of moving and tripping said toggle means in one direction when said piston is moved in one direction and capable of moving and tripping said toggle means in the other direction when said piston is moved in the other direction; said U-shaped member having substantial free movement in both directions prior to the moving and tripping of said toggle means.

5. In a fluid pressure actuated reciprocating mechanism, a base having a bore closed at each of its ends, a slot in said base communicating with said bore and parallel therewith, a free piston slidable in said bore, a radial member on said piston and extending through said slot, an inlet passageway in said base communicating with the inside of one end area of said bore, a second inlet passageway in said base communicating with the inside of the other end area of said bore, an exhaust passageway in said base communicating with the inside of one end area of said bore, a second exhaust passageway in said base communicating with the inside of the other end area of said bore, a movable rotatory valve means adapted to be in communication with a source of fluid pressure and capable of communicating with said first mentioned inlet passageway when in one position of its movement and capable of communicating with said second passageway when in a different position of its movement, a second movable rotatory valve means having an exhaust outlet and capable of communicating with said first mentioned exhaust passageway when in one position of its movement and capable of communicating with said second exhaust passageway when in a different position of its movement, spring loaded toggle means operatively connected to said first mentioned and said second movable valve means, U-shaped member on said radial member capable of moving and tripping said toggle means in one direction when said piston is moved in one direction and capable of moving and tripping said toggle means in the other direction when said piston is moved in the other direction; said toggle means comprising a spring loaded pivoted arm extending into said U-shaped member, and a spring loaded pivoted pin member of limited movement on said pivoted arm and operatively connected to said first and second mentioned movable valve means.

6. In a fluid pressure actuated reciprocating mechanism, a base having a bore closed at each of its ends, a slot in said base communicating with said bore and parallel therewith, a free piston slidable in said bore, a radial member on said piston and extending through said slot, an inlet passageway in said base communicating with the inside of one end area of said bore, a second inlet passageway in said base communicating with the inside of the other end area of said bore, an exhaust passageway in said base communicating with the inside of one end area of said bore, a second exhaust passageway in said base communicating with the inside of the other end area of said bore, a movable rotatory valve means adapted to be in communication with a source of fluid pressure and capable of communicating with said first mentioned inlet passageway when in one position of its movement and capable of communicating with said second passageway when in a different position of its movement, a second movable rotatory valve means having an exhaust outlet and capable of communicating with said first mentioned exhaust passageway when in one position of its movement and capable of communicating with said second exhaust passageway when in a different position of its movement, spring loaded toggle means operatively connected to said first mentioned and said second movable valve means, U-shaped member on said radial member capable of moving and tripping said toggle means in one direction when said piston is moved in one direction and capable of moving and tripping said toggle means in the other direction when said piston is moved in the other direction, a second slot in said base communicating with said bore and parallel therewith, and a power shaft extending from said piston and through said last mentioned slot.

7. In a fluid pressure actuated reciprocating mechanism, a base having a bore closed at each of its ends, a slot in said base communicating with said bore and parallel therewith, a free piston slidable in said bore, a radial member on said piston and extending through said slot, an inlet passageway in said base communicating with the inside of one end area of said bore, a second inlet passageway in said base communicating with the inside of the other end area of said bore, an exhaust passageway in said base communicating with the inside of one end area of said bore, a second exhaust passageway in said base communicating with the inside of the other end area of said bore, a movable rotatory valve means adapted to be in communication with a source of fluid pressure and capable of communicating with said first mentioned inlet passageway when in one position of its movement and capable of communicating with said second passageway when in a different position of its movement, a second movable rotary valve means having an exhaust outlet and capable of communicating with said first mentioned exhaust passageway when in one position of its movement and capable of communicating with said second exhaust passageway when in a different position of its movement, spring loaded toggle means operatively connected to said first mentioned and said second movable valve means, U-shaped member on said radial member capable of moving and tripping said toggle means in one direction when said piston is moved in one direction and capable of moving and tripping said toggle means in the other direction when said piston is moved in the other direction, and a means for adjustably regulating any fluid under pressure passing to said first mentioned valve means.

8. In a fluid pressure actuated reciprocating mechanism, a base having a bore closed at each of its ends, a slot in said base communicating with said bore and parallel therewith, a single free piston slidable in said bore, a radial member on said piston and extending through said slot, an inlet passageway in said base communicating with the inside of one end area of said bore, a second inlet passageway in said base communicating with the inside of the other end area of said bore, an exhaust passageway in said base communicating with the inside of one end area of said bore, a second exhaust passageway in said base communicating with the inside of the other end area of said bore, a movable rotatory valve means adapted to be in communication with a source of fluid pressure and capable of communicating with said first mentioned inlet passageway when in one position of its movement and capable of communicating with said second passageway when in a different position of its movement, a second movable rotatory valve means having an exhaust outlet and capable of communicating with said first mentioned exhaust passageway when in one position of its movement and capable of communicating with said second exhaust passageway when in a different position of its movement, spring loaded toggle means operatively connected to said first mentioned and said second movable valve means, and a U-shaped member on said radial member capable of moving and tripping said toggle means in one direction when said piston is moved in one direction and capable of moving and tripping said toggle means in the other direction when said piston is moved in the other direction; said U-shaped member having substantial free movement in both directions prior to the moving and tripping of said toggle means; said first mentioned valve means and said second valve means being synchronized one to the other whereby when said first mentioned valve means is in communication with one of its passageways communicated with one end area of said bore, said second valve means will be in communication with its passageway communicating with the other end area of said bore.

References Cited in the file of this patent

UNITED STATES PATENTS

| | | |
|---|---|---|
| 1,847,091 | Kuskin, et al. | Mar. 1, 1932 |
| 1,913,308 | Hueber, et al. | June 6, 1933 |
| 2,121,433 | Kettunen | June 21, 1938 |
| 2,265,307 | Orshansky | Dec. 9, 1941 |
| 2,543,686 | Brown | Feb. 27, 1951 |
| 2,678,029 | Sprague, et al. | May 11, 1954 |